Figure 1:
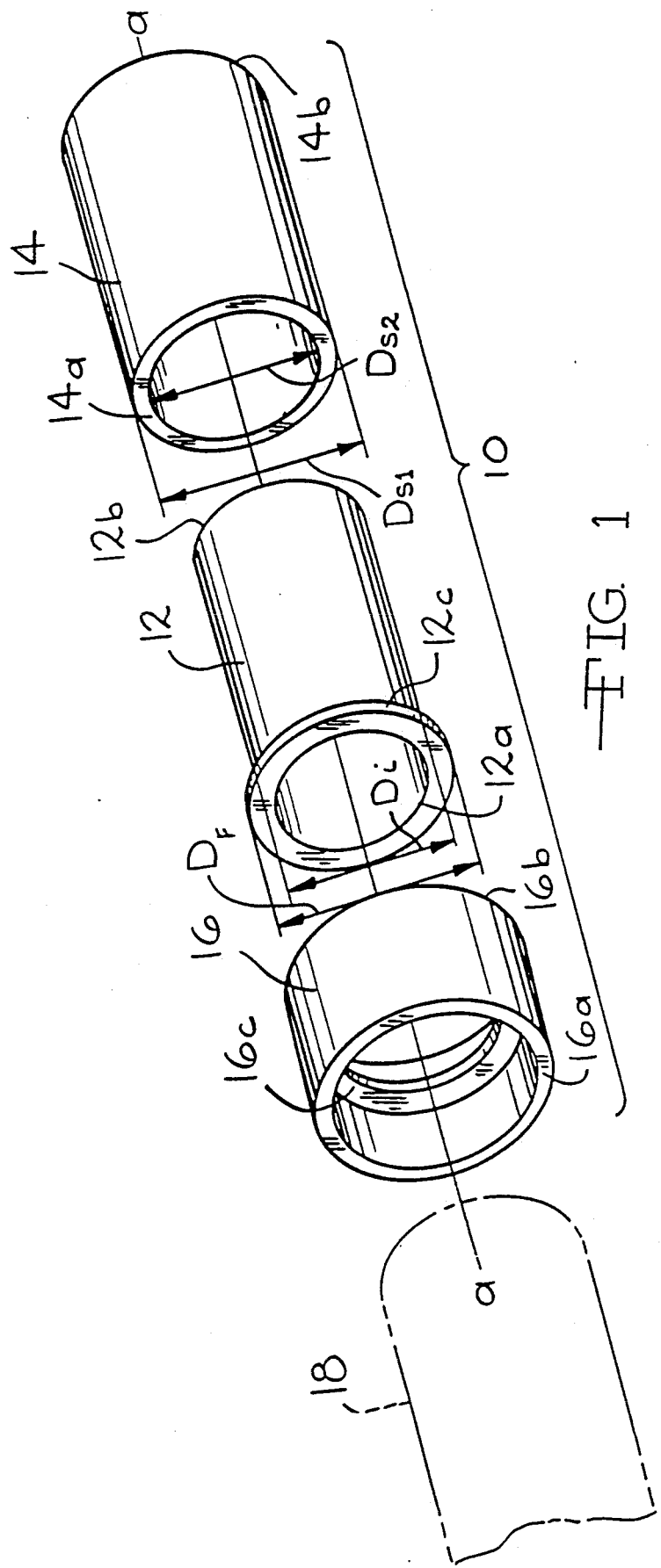

United States Patent [19]

Cornwall

[11] Patent Number: 5,076,309

[45] Date of Patent: Dec. 31, 1991

[54] FIRESTOP STUB-OUT ASSEMBLY

[76] Inventor: Kenneth R. Cornwall, 4963 Springfield Dr., Dunwoody, Ga. 30338

[21] Appl. No.: 683,845

[22] Filed: Apr. 11, 1991

[51] Int. Cl.$^5$ ............................................. F16L 5/00
[52] U.S. Cl. ..................................... 137/15; 137/360; 137/362; 285/64; 285/174; 285/915
[58] Field of Search ................ 285/915, 174, 64, 55; 137/360, 362, 15

[56] References Cited

U.S. PATENT DOCUMENTS

| | | | |
|---|---|---|---|
| 1,222,088 | 4/1917 | Evans, Sr. ........................ | 285/174 |
| 1,863,360 | 6/1932 | Weatherhead, Jr. ............. | 285/174 |
| 3,387,864 | 6/1958 | Walters ............................ | 285/915 |
| 2,880,020 | 8/1959 | Audette ............................ | 285/174 |
| 4,152,016 | 8/1979 | Weinhold ......................... | 285/174 |
| 4,583,565 | 4/1986 | Cornwall ......................... | 137/1 |
| 4,638,829 | 1/1987 | Cornwall ......................... | 137/362 |
| 4,724,858 | 2/1988 | Cornwall ......................... | 137/75 |
| 4,953,235 | 9/1990 | Cornwall ......................... | 285/64 |

Primary Examiner—A. Michael Chambers
Attorney, Agent, or Firm—Ian C. McLeod

[57] ABSTRACT

A firestop stub-out assembly (10) adapted to be mounted through fire rated wall members (100, 102) to prevent the spread of fire between rooms in a building through the stub-out assembly, is described. The assembly includes a non-flammable, cast iron insert (12), having an annular flange (12c) at one end, with the sleeve mounted inside of a flammable, plastic sleeve (14). The insert is locked inside of the sleeve by a plastic coupling (16) that mounts over and around the flange of the insert. The coupling provides a connection means for the sleeve to a water operated fixture and to fluid conduits (30, 32) mounted between the walls. The water trap (218) is mounted between the water operated fixture and the sleeve and prevents air from entering the conduits through the water operated fixture.

48 Claims, 3 Drawing Sheets

5,076,309

FIRESTOP STUB-OUT ASSEMBLY

BACKGROUND OF THE INVENTION

(1) Field of the Invention

The present invention relates to an improved stub-out assembly for use in buildings which allows penetration of piping through a flammable or fire rated wall without creating a fire path between rooms in a building. In particular, the present invention relates to a stub-out assembly which comprises an iron insert mounted inside of a plastic sleeve that is adapted to connect a water operated fixture to a piping system mounted between spaced apart fire rated wall sections forming a hollow wall between rooms in a building. The iron insert greatly reduces the flammability of the plastic sleeve (or pipe) by depriving oxygen from the inside of the sleeve.

(2) Prior Art

Pipe penetrations through walls in buildings create a number of problems because a seal between the rooms is broken by the pipe. The problem of fire safety when piping penetrates fire rated walls between rooms in a building is particularly troublesome because the pipe opening can jeopardize the fire integrity of the entire building. As a result, in most buildings plastic (PVC) pipe is not used since fire can easily penetrate a fire rated wall by burning the plastic pipe. The present invention solves the fire safety problem associated with plastic pipe penetration through fire rated walls so that plastic pipe can be used as a construction material in buildings. The prior art has not provided a solution to this problem which is acceptable to fire marshals, government officials, insurance companies and others responsible for fire safety in the community.

My U.S. Pat. Nos. 4,583,565; 4,638,829 and 4,724,858 describe firestop fittings particularly adapted to prevent the spread of smoke and fire between floors in a multi-story building by plugging off any potential fire path through a vertical pipe between the floors. These patents describe an assembly where a non-flammable plug is released by heat less than required for heat destruction of a plastic coupling mounted in a concrete floor. Upon being released, the plug moves into and seals in an iron fitting mounted inside of the plastic coupling. While the plug acts as a non-flammable barrier through the iron fitting, the portion of the iron fitting below the sealed plug helps to retard the spread of fire through the plastic coupling by depriving the inside of the coupling of oxygen. None of these patents suggest an embodiment where the coupling and fitting without a plug are mounted horizontally through a flammable or fire rated wall.

My U.S. Pat. No. 4,953,235 describes a trap fitting assembly that uses a flammable coupling vertically mounted through a concrete floor. A non-flammable sleeve is mounted inside of the coupling and extends below the coupling for connection to a non-flammable J-pipe. The J-pipe contains water at a level sufficient to prevent smoke and fire from spreading through the floor through the flammable coupling. The sleeve prevents fire from spreading through the trap fitting by depriving the inside of the coupling of oxygen needed to sustain the spread of fire through the coupling. This invention is not adapted to be mounted horizontally through a flammable or fire rated wall between rooms in a building.

OBJECTS

It is therefore an object of the present invention to provide an improved firestop stub-out assembly for penetration through a flammable or fire rated wall between rooms in a building that is adapted for connection to a water operated fixture and a plastic drain pipe. Further, it is an object of the present invention to provide an improved firestop stub-out assembly that uses a non-flammable insert inside of a flammable, plastic sleeve to deprive the inside of the sleeve of oxygen necessary to sustain the spread of fire along the sleeve. Further, it is an object of the present invention to provide an improved firestop stub-out assembly for penetration through a flammable or fire rated wall between rooms in a building which satisfies those people responsible for overseeing fire codes for new building construction. Still further, it is an object of the present invention to provide an improved firestop stub-out assembly which is inexpensive to manufacture and easily mounted between adjoining rooms in a building. These and other objects will become increasingly apparent by reference to the following descriptions and to the drawings.

IN THE DRAWINGS

FIG. 1 is a separated perspective of a stub-out assembly 10 of the present invention particularly showing a cast iron insert 12 which is mounted inside of a plastic sleeve 14 and locked in place by a plastic coupling 16.

Figure 2:
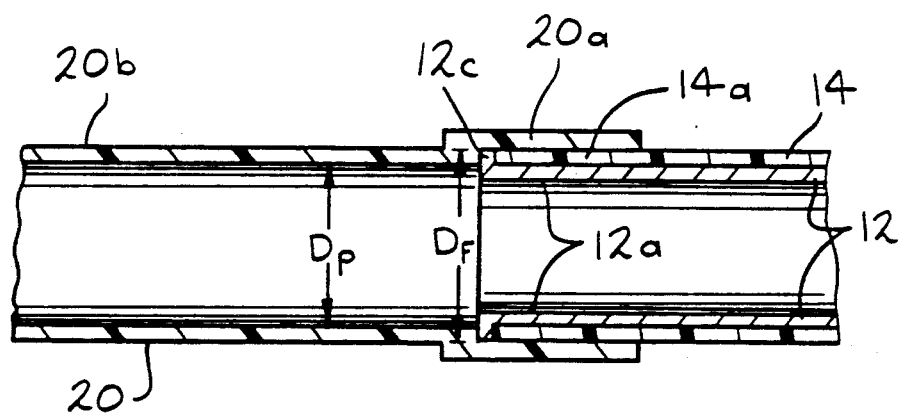

FIG. 2 is a cross-sectional view showing the insert 12 with an annular flange 12c locked inside of sleeve 14 by a pipe 20 having a constricted portion 20b.

Figure 3:
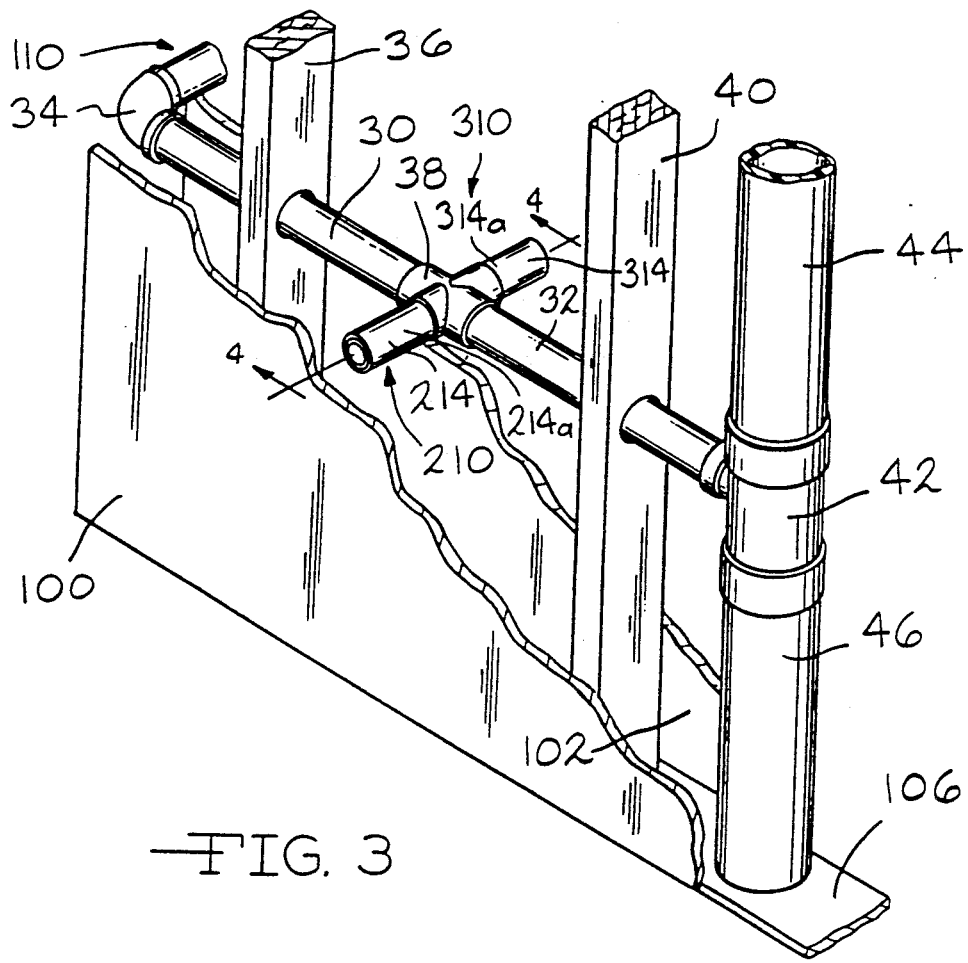

FIG. 3 is a perspective of three stub-out assemblies 110, 210 and 310 mounted through wall members 100 and 102 and connected to fluid trap conduits 30 and 32.

Figure 4:
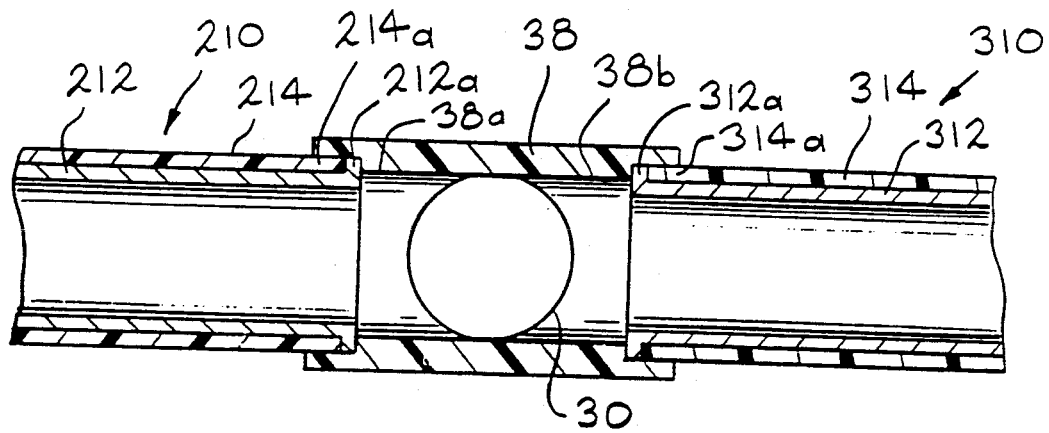

FIG. 4 is a cross-section view along line 4—4 of FIG. 3 showing the stub-out assemblies 210 and 310 connected to opposed ends of a four-way cross connector 38.

Figure 5:
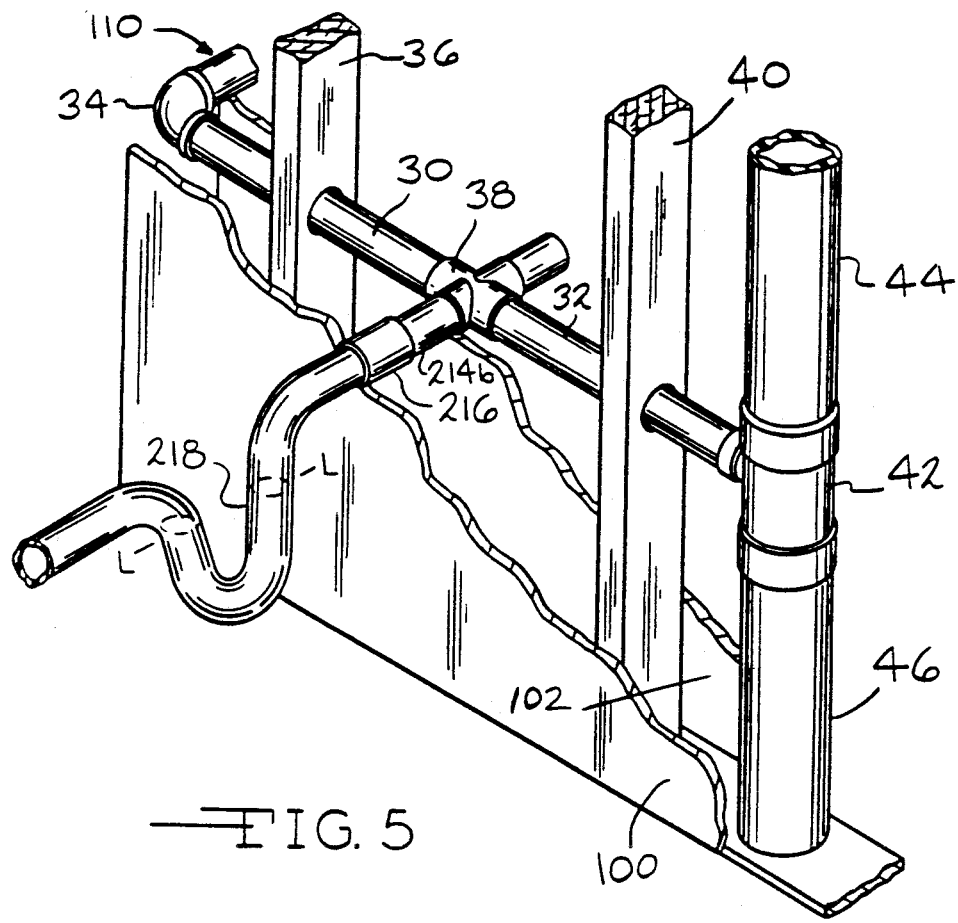

FIG. 5 is a perspective of the three stub-out assemblies 110, 210 and 310 with a water trap 218 filled with water to level L—L and connected to stub-out assembly 210 by a coupling 216.

GENERAL DESCRIPTION

The present invention relates to an improved stub-out assembly that prevents smoke and fire from spreading through an opening in a wall of a building through the stub-out assembly which comprises: a flammable, fluid carrying sleeve means having opposed ends which provide an opening along a longitudinal axis through the wall of the building with an outside wall of the sleeve means mounted in the opening of the wall of the building, the sleeve means being adapted to be connected to a first and second fluid conduit means at each of the opposed ends; a non-flammable insert means mounted inside the sleeve means wherein the insert means has spaced apart ends along the axis with a flange means at one of the ends of the insert means adjacent to one of the ends of the sleeve means; and a first coupling means mounted at the one of the ends of the sleeve means and at the one of the ends of the insert means over and around the flange means of the insert means to retain the insert means inside the sleeve means.

The stub-out assembly preferably mounts a water operated fixture of the kind typically found in a lavatory, bathtub or sink to a fluid conduit mounted in the enclosed space between wall members of a flammable wall for draining the water operated fixture.

SPECIFIC DESCRIPTION

FIGS. 1 to 3 show an improved firestop stub-out assembly 10 of the present invention. As particularly shown in FIG. 1, the stub-out assembly 10 comprises a non-flammable cylindrical insert 12 having spaced apart ends 12a and 12b which form an opening along a longitudinal axis a—a. The insert 12 is preferably made of cast iron and has an annular flange 12c adjacent to end 12a. A flammable, cylindrical sleeve 14, preferably made of plastic PVC, has spaced apart ends 14a and 14b which form a cylindrical opening along the axis a—a. The insert 12 is mounted inside of the sleeve 14 with the annular flange 12c abutting against the end 14a of the sleeve 14 and with the end 12b of the insert 12 and the end 14b of the sleeve 14 in a common plane perpendicular to the axis a—a. The outside diameter $D_f$ of the annular flange 12c is equal to the outside diameter $D_{s1}$ of the sleeve 14 for ease of mounting coupling 16 as discussed hereinafter. Also, because the outside diameter $D_i$ of the insert 12 is only slightly smaller than the inside diameter $D_{s2}$ of the sleeve 14, the insert 12 greatly reduces the flammability of the flammable sleeve 14 by sealing off the inside of the sleeve 14.

The stub-out assembly 10 is completed by a cylindrical plastic PVC coupling 16 having spaced apart ends 16a and 16b which form an opening along the axis a—a. An internal inner annular rim 16c is provided on the inside of the coupling 16 between the ends 16a and 16b. The end 16b of the coupling 16 is solvent welded or bonded to the end 14a of the sleeve 14, over the annular flange 12c of the insert 12 The inner annular rim 16c locks the cast iron insert 12 inside the plastic sleeve 14. The rim 16c is preferred; however, other retaining means for insert 12 can be used.

The coupling 16 is adapted to be connected to a water operated fixture (not shown) or to a fluid carrying conduit pipe 18. It should be understood that the annular flange 12c of the insert 12 and end 14a of the sleeve 14 need not always be connected by a coupling 16 to a water operated fixture or a conduit pipe for the stub-out assembly 10 to function properly. As shown in FIG. 2, as long as the end 14a of the sleeve 14 adjacent to the annular flange 12c of insert 12 is connected to an end 20a of a pipe 20 adjacent to a constricted portion 20b having a diameter $D_p$ less than the outside diameter $D_f$ of the annular flange 12c of the insert 12, the insert 12 will be locked inside of the sleeve 14. Thus, the stub-out assembly 10 maintains the benefits of light weight plastic PVC pipe as a building material while at the same time acting as a fire barrier through a wall (not shown) in a building through the stub-out assembly 10.

FIG. 3 is illustrative of several applications in which three stub-out assemblies 110, 210 and 310 are connected to a first and second plastic fluid conduits 30 and 32 mounted between fire rated wall members 100 and 102 in a building. The first stub-out assembly 110 is connected to a plastic elbow fitting 34. The elbow fitting 34 connects at a 90° angle from the first stub-out assembly 110 to the first fluid conduit 30 mounted through a wall stud 36 mounted between the wall members 100 and 102.

The first plastic fluid conduit 30 connects to a plastic four-way cross connector 38 that connects the opposed stub-out assemblies 210 and 310 through the wall members 100 an-d 102, respectively. As shown in FIG. 4, the stub-out assembly 210 is comprised of a cast iron insert 212 mounted inside of a flammable, plastic PVC sleeve 214 as described with respect to FIG. 1. The insert 212 has an annular flange 212a that abuts against a first end 214a of the sleeve 214 and which is mounted adjacent to an inside shoulder 38a of the coupling 38. The sleeve 214 is then solvent welded or bonded to the four-way cross connector 38 to lock the insert 212 inside of the sleeve 214. In a similar manner, the stub-out assembly 310 is comprised of a cast iron insert 312 mounted inside of a plastic sleeve 314 bonded to the coupling 38 with annular flange 312a locked between an end 314a of the sleeve 314 and an inside shoulder 38b of the four-way cross connector 38.

FIG. 3 shows a piping system mounted between wall members 100 and 102 wherein the second fluid conduit 32 is mounted through a wall stud 40 and connected between the four-way cross connector 38 and a plastic tee pipe 42. The tee pipe 42 connects to vertical fluid pipes 44 and 46 that provide water or drainage between lower floor 106 and an upper floor (not shown) in the building. As shown in FIG. 5, the piping system is completed by a coupling 216 mounted at a second end 214b of the sleeve 214. The coupling 216 is preferably connected to a water trap 218 which is connected to a water operated fixture (not shown) mounted in a room (not shown) of the building. The water trap 218 is filled with water to level L—L. The coupling 216 can also be connected to a closure means such as a cap (not shown) which prevents air from reaching inside the stub-out assembly 210. The water trap 218 is preferred, however, and ensures that air will not be able to invade into the piping system from the water operated fixture. Keeping air from reaching the piping system is important because it helps to prevent any fire that is burning between the walls 100 and 102 from being fed with air through the sleeve 214 of the stub-out assembly 210. A fire burning between the walls 100 and 102 will burn the conduits 30 and 32. However, the walls 100 and 102 are fire rated and the fire will not easily burn through the walls 100 and 102. The fire will eventually breach the walls 100 and 102, but in the meantime, the water trap 218 and the stub-out assembly 210 will have provided valuable time to safely evacuate the burning building. The water trap 218 ensures that air will not move through the inside of the stub-out assembly 210. This construction also keeps the fire from breaching the wall 100 through the stub-out assembly 210 since the sleeve 212 also prevents the fire from burning through the wall 100 through the stub-out assembly 210. Further, the sleeve 212 also prevents a fire burning in a room on the outside of wall 100 from breaching the wall 100 and invading into the space between the walls 100 and 102. The other stub-out assemblies 110 and 310, are similarly closed by water traps (not shown) which prevent air from invading to the inside of the stub-out assemblies 110 and 310.

It should be appreciated that FIGS. 3 and 5 are merely illustrative of the three stub-out assemblies 110, 210 and 310 connected through wall members 100 and 102. The stub-out assemblies 110, 210 and 310 are similar to the stub-out assembly 10 described in FIG. 1. In practice, however, any number of stub-out assemblies 10 can be connected to any number of water operated fixtures (not shown) arranged in a battery and to fluid conduits mounted between fire rated walls in a building. In all cases where the connection between couplings and drainage pipes or fluid conduits is between plastic members, the members are preferably made of PVC and are preferably solvent welded or bonded to each other.

Numerous variations will occur to those skilled in the art. It is intended that the foregoing descriptions be only illustrative of the present invention and that the present inventions be only limited by the hereinafter appended claims.

I claim:

1. A method of a building construction which prevents the spread of smoke and fire through a wall of a building which comprises:
    (a) providing an improved stub-out assembly that prevents smoke and fire from spreading through an opening in the wall of the building through the stub-out assembly which comprises: a flammable, fluid carrying sleeve means having opposed ends which provide an opening along a longitudinal axis through the wall of the building with an outside wall of the sleeve means mounted in the opening of the wall of the building, the sleeve means being adapted to be connected to a first and a second fluid conduit means at each of the opposed ends; a non-flammable insert means mounted inside the sleeve means wherein the insert means has spaced apart ends along the axis with a flange means at one of the ends of the insert means adjacent to one of the ends of the sleeve means; and a first coupling means mounted at the one of the ends of the sleeve means and at the one of the ends of the insert means over and around the flange means of the insert means to retain the insert means inside the sleeve means;
    (b) mounting the sleeve means with the insert means and the first coupling means through the opening in the wall of the building; and
    (c) connecting the first fluid carrying conduit means to the first coupling means to the one of the ends of the sleeve means and the second fluid carrying conduit means to the second coupling means to the other of the ends of the sleeve means so as to convey fluid from a room in the building.

2. The method of claim 1 wherein the sleeve means and the insert means which have substantially the same length along the longitudinal axis.

3. The method of claim 1 with the first coupling means having an inside wall between opposed ends which provides an opening along the longitudinal axis for connecting the first fluid conduit means to the sleeve means, wherein an inner annular retention means is provided on the inside wall around the longitudinal axis of the first coupling means to retain the insert means inside the sleeve means.

4. The method of claim 3 wherein the inner annular retention means of the first coupling means is an inner annular ring means having an inner annular diameter equal to an inner annular diameter of the first fluid conduit means.

5. The method of claim 1 wherein the wall of the building is comprised of a first and a second parallel wall members having an inside space between the first and the second wall members with the second fluid conduit means mounted between the first and the second wall members by the second coupling means.

6. The method of claim 5 wherein the first fluid conduit means which is mounted in the room of the building has opposed ends providing an opening between the opposed ends and wherein one of the ends of the first fluid conduit means is connected to the first coupling means with the other of the ends of the first fluid conduit means connected to a water operated fixture means which is mounted in the room of the building and wherein the water operated fixture means is drained through the first fluid conduit means, the stub-out assembly and the second fluid conduit means which is mounted between the first and second wall members.

7. The method of claim 6 wherein the first conduit means is a water trap fitting means mounted between the water operated fixture means and the first coupling means for ensuring that air will not invade into the stub-out assembly and the second fluid conduit means through the water operated fixture.

8. The method of claim 5 wherein the first fluid conduit means which is mounted in the room of the building has opposed ends providing an opening between the opposed ends and wherein one of the ends of the first fluid conduit means is connected to the first coupling means with the other of the ends of the first fluid conduit means connected to a fixture means forming a closure means that prevents air from invading through the fixture means to the first fluid conduit means, the stub-out assembly and the second fluid conduit means mounted between the first and the second wall members.

9. The method of claim 5 wherein the sleeve means and the first coupling means are made of plastic which are solvent welded or bonded together and wherein the sleeve means and the second coupling means are made of plastic which are solvent welded or bonded together.

10. The method of claim 5 wherein the second coupling means is a right angled elbow connection means.

11. The method of claim 5 wherein the second coupling means is a T-pipe connection means.

12. The method of claim 5 wherein the second coupling means is a cross pipe connection means.

13. The method of claim 1 wherein the insert means is made of cast iron.

14. The method of claim 1 wherein the sleeve means and the insert means have a circular cross-section along the longitudinal axis.

15. The method of claim 1 wherein an outer diameter of the flange means at the one of the ends of the insert means is equal to an outside diameter of the outside wall of the sleeve means.

16. The method of claim 5 wherein the second fluid conduit means connected to the other of the ends of the sleeve means by the second coupling means is supported between the wall members by a support means.

17. An improved stub-out assembly that prevents smoke and fire from spreading through an opening in a wall of a building through the stub-out assembly which comprises:
    (a) a flammable, fluid carrying sleeve means having opposed ends which provide an opening along a longitudinal axis through the wall of the building with an outside wall of the sleeve means mounted in the opening of the wall of the building, the sleeve means being adapted to be connected to a first and a second fluid conduit means at each of the opposed ends;
    (b) a non-flammable insert means mounted inside the sleeve means wherein the insert means has spaced apart ends along the axis with a flange means at one of the ends of the insert means adjacent to one of the ends of the sleeve means; and
    (c) a first coupling means mounted at the one of the ends of the sleeve means and mounted at the one of the ends of the insert means over and around the flange means of the insert means to retain the insert means inside the sleeve means.

18. The stub-out assembly of claim 17 wherein the sleeve means and the insert means have substantially the same length along the longitudinal axis.

19. The stub-out assembly of claim 17 with the first coupling means having an inside wall between opposed ends which provides an opening along the longitudinal axis for connecting the first fluid conduit means to the sleeve means, wherein an inner annular retention means is provided on the inside wall around the longitudinal axis of the first coupling means to retain the insert means inside the sleeve means.

20. The stub-out assembly of claim 19 wherein the inner annular retention means of the first coupling means is an inner annular ring means having an inner annular diameter equal to an inner annular diameter of the first fluid conduit means.

21. The stub-out assembly of claim 17 wherein the wall of the building is comprised of a first and a second parallel wall members having an inside space between the first and the second wall members with the one of the ends of the sleeve means connected by the first coupling means to the first fluid conduit means which is mounted in a room of the building and with the other of the ends of the sleeve means connected by a second coupling means to the second fluid conduit means which is mounted between the first and the second wall members for draining the first fluid conduit means.

22. The stub-out assembly of claim 21 wherein the first fluid conduit means which is mounted in the room of the building has opposed ends providing an opening between the opposed ends, wherein one of the ends of the first fluid conduit means is connected to the first coupling means with the other of the ends of the first fluid conduit means connected to a water operated fixture means which is mounted in the room of the building and wherein the water operated fixture is drained through the first fluid conduit means, the stub-out assembly and the second fluid conduit means which is mounted between the first and second wall members.

23. The stub-out assembly of claim 22 wherein the first fluid conduit means is a water trap fitting means mounted between the water operated fixture means and the first coupling means for ensuring that air will not invade into the stub-out assembly and the second fluid conduit means through the water operated fixture.

24. The stub-out assembly of claim 21 wherein the first fluid conduit means which is mounted in the room of the building has opposed ends providing an opening between the opposed ends, wherein one of the ends of the first fluid conduit means is connected to the first coupling means with the other of the ends of the first fluid conduit means connected to a fixture means forming a closure means that prevents air from invading through the fixture means to the first fluid conduit means, the stub-out assembly and the second fluid conduit means mounted between the first and the second wall members.

25. The stub-out assembly of claim 21 wherein the sleeve means and the first coupling means are made of plastic which are solvent welded or bonded together and wherein the sleeve means and the second coupling means are made of plastic which are solvent welded or bonded together.

26. The stub-out assembly of claim 21 wherein the second coupling means is a right angled elbow connection means.

27. The stub-out assembly of claim 21 wherein the second coupling means is a T-pipe connection means.

28. The stub-out assembly of claim 21 wherein the second coupling means is a cross pipe connection means.

29. The stub-out of claim 17 wherein the insert means is made of cast iron.

30. The stub-out assembly of claim 17 wherein the sleeve means and the insert means have a circular cross-section along the longitudinal axis.

31. The stub-out assembly of claim 17 wherein an outer diameter of the flange means at the one of the ends of the insert means is equal to an outside diameter of the outside wall of the sleeve means.

32. The stub-out assembly of claim 21 wherein the second fluid conduit means connected to the other of the ends of the sleeve means by the second coupling means is supported between the wall members by a support means.

33. A building construction which prevents the spread of smoke and fire through a wall of a building which comprises:
  (a) an improved stub-out assembly that prevents smoke and fire from spreading through an opening in a wall of the building through the stub-out assembly which comprises: a flammable, fluid carrying sleeve means having opposed ends which provide an opening along a longitudinal axis through the wall of the building with an outside wall of the sleeve means mounted in the opening of the wall of the building, the sleeve means being adapted to be connected to a first and a second fluid conduit means at each of the opposed ends; a non-flammable insert means mounted inside the sleeve means wherein the insert means has spaced apart ends along the axis with a flange means at one of the ends of the insert means adjacent to one of the ends of the sleeve means; and a first coupling means mounted at the one of the ends of the sleeve means and mounted at the one of the ends of the insert means over and around the flange means of the insert means to retain the insert means inside the sleeve means;
  (b) mounting the sleeve means with the insert means and the first coupling means through the opening in the wall of the building; and
  (c) connecting the first fluid carrying conduit means to the first coupling means to the one of the ends of the sleeve means and the second fluid carrying conduit means to the second coupling means to the other of the ends of the sleeve means so as to convey fluid from a room in the building.

34. The building construction of claim 33 wherein the sleeve means and the insert means which have substantially the same length along the longitudinal axis.

35. The building construction of claim 33 with the first coupling means having an inside wall between opposed ends which provides an opening along the longitudinal axis for connecting the first fluid conduit means to the sleeve means, wherein an inner annular retention means is provided on the inside wall around the longitudinal axis of the first coupling means to retain the insert means inside the sleeve means.

36. The building construction of claim 35 wherein the inner annular retention means of the first coupling means is an inner annular ring means having an inner annular diameter equal to an inner annular diameter of the first fluid conduit means.

37. The building construction of claim 33 wherein the wall of the building is comprised of a first and a second parallel wall members having an inside space between the first and the second wall members with the second fluid conduit means mounted between the first and the second wall members by the second coupling means.

38. The building construction of claim 37 wherein the first fluid conduit means which is mounted in the room of the building has opposed ends providing an opening between the opposed ends and wherein one of the ends of the first fluid conduit means is connected to the first coupling means with the other of the ends of the first fluid conduit means connected to a water operated fixture means which is mounted in the room of the building and wherein the water operated fixture means is drained through the first fluid conduit means, the stub-out assembly and the second fluid conduit means which is mounted between the first and second wall members.

39. The building construction of claim 38 wherein the first fluid conduit means is a water trap fitting means mounted between the water operated fixture means and the first coupling means for ensuring that air will not invade into the stub-out assembly and the second fluid conduit means through the water operated fixture.

40. The building construction of claim 37 wherein the first fluid conduit means which is mounted in the room of the building has opposed ends providing an opening between the opposed ends and wherein one of the ends of the first fluid conduit means is connected to the first coupling means with the other of the ends of the first fluid conduit means connected to a fixture means forming a closure means that prevents air from invading through the fixture means to the first fluid conduit means, the stub-out assembly and the second fluid conduit means, mounted between the first and the second wall members.

41. The building construction of claim 37 wherein the sleeve means and the first coupling means are made of plastic which are solvent welded or bonded together and wherein the sleeve means and the second coupling means are made of plastic which are solvent welded or bonded together.

42. The building construction of claim 37 wherein the second coupling means is a right angled elbow connection means.

43. The building construction of claim 37 wherein the second coupling means is a T-pipe connection means.

44. The building construction of claim 37 wherein the second coupling means is a cross pipe connection means.

45. The building construction of claim 33 wherein the insert means is made of cast iron.

46. The building construction of claim 33 wherein the sleeve means and the insert means have a circular cross-section along the longitudinal axis.

47. The building construction of claim 33 wherein an outer diameter of the flange means at the one of the ends of the insert means is equal to an outside diameter of the outside wall of the sleeve means.

48. The building construction of claim 37 wherein the second fluid conduit means connected to the other of the ends of the sleeve means by the second coupling means is supported between the wall members by a support means.

* * * * *